(12) United States Patent
Peterson et al.

(10) Patent No.: US 7,757,405 B2
(45) Date of Patent: Jul. 20, 2010

(54) TRIMMER WITH RECIPROCATING BLADES

(75) Inventors: Brent Peterson, Buffalo Grove, IL (US); David Ni, Wilmette, IL (US)

(73) Assignee: Echo, Incorporated, Lake Zurich, IL (US)

( * ) Notice: Subject to any disclaimer, the term of this patent is extended or adjusted under 35 U.S.C. 154(b) by 272 days.

(21) Appl. No.: 11/523,209

(22) Filed: Sep. 19, 2006

(65) Prior Publication Data

US 2008/0066325 A1    Mar. 20, 2008

(51) Int. Cl.
*A01G 3/04* (2006.01)
(52) U.S. Cl. .......................................... 30/220; 30/216
(58) Field of Classification Search ................... 30/220, 30/216, 223, 369
See application file for complete search history.

(56) References Cited

U.S. PATENT DOCUMENTS

| | | | |
|---|---|---|---|
| 2,630,628 A | | 3/1953 | Hall |
| 2,658,273 A | * | 11/1953 | Dodegge ..................... 30/216 |
| 2,757,453 A | * | 8/1956 | Brunson ...................... 30/264 |
| 2,787,111 A | | 4/1957 | Templeton |
| 3,802,075 A | | 4/1974 | Taylor et al. |
| 3,897,630 A | | 8/1975 | Glover et al. |
| 3,962,924 A | * | 6/1976 | Glover et al. .................. 74/50 |
| 4,926,556 A | * | 5/1990 | Pilatowicz et al. ............ 30/216 |
| 5,271,154 A | | 12/1993 | Ohkanda |
| 5,373,641 A | | 12/1994 | Ohkanda |
| 5,689,887 A | | 11/1997 | Heywood et al. |
| 6,263,579 B1 | | 7/2001 | Nagashima |
| 6,598,299 B2 | | 7/2003 | Stark et al. |
| 6,698,177 B1 | | 3/2004 | Akehi et al. |
| 2005/0076628 A1 | * | 4/2005 | Law ........................... 56/264 |
| 2005/0102839 A1 | * | 5/2005 | Stones ........................ 30/216 |

* cited by examiner

*Primary Examiner*—Stephen Choi
(74) *Attorney, Agent, or Firm*—Wood, Phillips, Katz, Clark & Mortimer (57) ABSTRACT

A trimmer having a first cutting blade and a second cutting blade. A first drive gear assembly cooperates with the cutting blades so that as the first drive gear assembly rotates around a first axis, the cutting blades are caused to reciprocatingly move in first and second paths to produce a cutting action. A second drive gear assembly has a second drive gear that has teeth in mesh with teeth on the first drive gear assembly. The second drive gear is rotatable around a second axis to cause the first drive gear assembly to be rotated in the first rotational direction. A powered drive assembly rotates the second drive gear around a second axis in the one rotational direction. The teeth on the first drive gear assembly are defined by a first bevel gear. The second gear is a bevel gear in mesh with the first bevel gear.

18 Claims, 5 Drawing Sheets

FIG. 4 ions, the first and second cutting blades are caused to reciprocatingly move, one relative to the other, respectively in first and second paths, so that the first and second cutting edges cooperate to produce a cutting action. A second drive gear assembly has a second drive gear that has teeth that are in mesh with teeth on the first drive gear assembly. The second drive gear is rotatable around a second axis continuously in one rotational direction to thereby cause the first drive gear assembly to be continuously rotated in the first rotational direction. A powered drive assembly rotates the second drive gear around a second axis in the one rotational direction. The teeth on the first drive gear assembly are defined by a first bevel gear. The second gear is a bevel gear that is in mesh with the first bevel gear.

TRIMMER WITH RECIPROCATING BLADES

BACKGROUND OF THE INVENTION

1. Field of the Invention

This invention relates to trimmers, as for hedges and the like and, more particularly, to a trimmer having blades that are reciprocated relative to each other to effect cutting.

2. Background Art

One common design for a trimmer for live growth, such as hedges, utilizes a pair of blades that are moved, one relative to the other, to effect cutting. In the most common configuration, each of the blades is substantially straight and projects along a line, with the projecting lines substantially parallel to each other. Each blade has a scalloped configuration on opposite sides of its lengthwise center line defining discrete cutting edges operable to effect severance of vegetation as the blades reciprocatingly translate in opposite directions in a direction parallel to their lengths. As the cutting blades move against and relative to each other, the cutting edges thereon cooperate to sever an object with a pinching or scissors-like action.

Hedge trimmers of this type are normally designed to be portable, hand-held units. A frame/housing, which supports the cutting blades and the drive gearing, is generally equipped with a pair of handles that facilitate lifting and controlled repositioning of the entire unit by a user. The frame/housing further supports a powered drive assembly in the form of a motor that may be gas driven or driven electrically, either through a battery or as by household current.

Designers of this type of equipment strive to make the same as compact as possible, without detracting from performance, thereby to facilitate handling by a user. Designers focus, particularly in this regard, on the region of the unit between the cutting blades and the powered drive assembly. Ideally, projections to beyond the combined thickness of the cutting blades are maintained, at a minimum, particularly in the vicinity of the cutting blades. These projections have a tendency to interfere, particularly with limbs, as the cutting blades are maneuvered over vegetation in use.

Heretofore, a number of such trimmers have utilized a first gear with axially opposite sides having drive components to cooperate, one each with one of the cutting blades. As the first gear is rotated around a first axis, the cutting blades are moved reciprocatingly in substantially linear paths in opposite directions. This first gear has peripheral teeth that are in mesh with teeth on a second gear that rotates about a second axis that is substantially parallel to the first axis. To accommodate the second gear, and the component(s) directly driving the same, the frame/housing over this region is required to have a substantial axial extent. A structure representative of that described above is shown in U.S. Pat. No. 3,802,075. As can be seen, the frame/housing, at a location at which these gears are contained, has a prominent axial projection at the proximal ends of the cutting blades. This results in a relatively high profile frame/housing that potentially makes it more cumbersome and prone to hanging up on vegetation as the unit is manipulated to effect severance thereof.

SUMMARY OF THE INVENTION

In one form, the invention is directed to a trimmer having a first cutting blade having a first cutting edge and a second cutting blade having a second cutting edge. A first drive gear assembly rotates as one piece around a first axis. The first drive gear assembly cooperates with the first and second cutting blades so that as the first drive gear assembly rotates around the first axis continuously in a first rotational direc- In one form, the first and second blades are elongate with a length extending along first and second substantially parallel lines, and the first and second paths are substantially parallel to the first and second lines.

In one form, the first and second blades reciprocate in their respective paths substantially parallel to a reference plane, and the second axis is substantially parallel to the reference plane.

The second axis may be substantially parallel to the first and second lines.

In one form, the first bevel gear has substantially flat surfaces that face axially oppositely with respect to the first axis. The first cam element projects axially relative to the first axis from one of the axially oppositely facing surfaces on the first bevel gear and drives the first cutting blade in the first cutting path as the first bevel gear rotates. A second cam element projects axially relative to the first axis from the other of the axially oppositely facing surfaces of the first bevel gear and drives the second cutting element in the second cutting path as the first bevel gear rotates.

In one form, there is a first connecting rod that transfers drive forces between the first cam element and the first cutting blade and a second connecting rod that transfers drive forces between the second cam element and the second cutting blade.

The trimmer may further include a frame/housing with a frame/housing portion having first and second housing parts that are joined to captively maintain the first drive gear assembly in an operative position.

The frame/housing portion defines a receptacle for the first drive gear assembly, with the frame/housing portion having a width that tapers in a direction approaching the first and second cutting blades.

In one form, the first and second cutting blades have a combined width. The first bevel gear has a diameter, and the width of the frame/housing portion tapers from a dimension slightly greater than the diameter of the first bevel gear to an end having a width less than the combined width of the cutting elements.

In one form, the first cam element has a substantially round shape with a central axis that is parallel to, and spaced from, the first axis. The second cam element has a substantially round shape with a central axis that is parallel to, and spaced from, the first axis.

In one form, the first axis extends through the first and second cam elements.

In one form, one of the housing parts has a discrete receptacle conforming to and for receiving the first bevel gear.

In one form, the first and second cutting blades have a width bisected by a reference plane, and the second axis coincides with a reference plane.

In another form, the invention is directed to a trimmer having a first cutting blade having a first cutting edge and a second cutting blade having a second cutting edge. A first drive gear assembly rotates as one piece around a first axis. The first drive gear assembly cooperates with the first and second cutting blades so that as the first drive gear assembly rotates around the first axis continuously in a first rotational direction, the first and second cutting blades are caused to reciprocatingly move, one relative to the other, respectively in first and second paths, so that the first and second cutting edges cooperate to produce a cutting action. A second drive gear assembly has a second drive gear that has teeth that are in mesh with teeth on the first drive gear assembly. The second drive gear is rotatable around a second axis continuously in one rotational direction to thereby cause the first drive gear assembly to be continuously rotated in the first rotational direction. A powered drive assembly rotates the second drive gear around a second axis in the one rotational direction. The first and second blades are elongate with a length extending along first and second substantially parallel lines. The first and second paths are substantially parallel to the first and second lines. The second axis is substantially parallel to the first and second lines.

In one form, the first and second blades reciprocate in their respective paths substantially parallel to a reference plane, and the second axis is substantially parallel to the reference plane.

In one form, the first drive gear assembly gear has substantially flat surfaces that face axially oppositely with respect to the first axis. A first cam element projects axially relative to the first axis from one of the axially oppositely facing surfaces on the first drive gear assembly and drives the first cutting blade in the first cutting path as the first drive gear assembly rotates. A second cam element projects axially relative to the first axis from the other of the axially oppositely facing surfaces on the first drive gear assembly and drives the second cutting blade in the second cutting path as the first drive gear assembly rotates.

In one form, the trimmer has a frame/housing with a frame/housing portion having first and second housing parts that are joined to captively maintain the first drive gear assembly in an operative position.

In one form, the first cam element has a substantially round shape with a central axis that is parallel to, and spaced from, the first axis. The second cam element has a substantially round shape with a central axis that is parallel to, and spaced from, the first axis.

In one form, the first axis extends through the first and second cam elements.

In one form, the first and second cutting blades have a width bisected by a reference plane, and the second axis coincides with the reference plane.

DETAILED DESCRIPTION OF THE DRAWINGS

Figure 1:
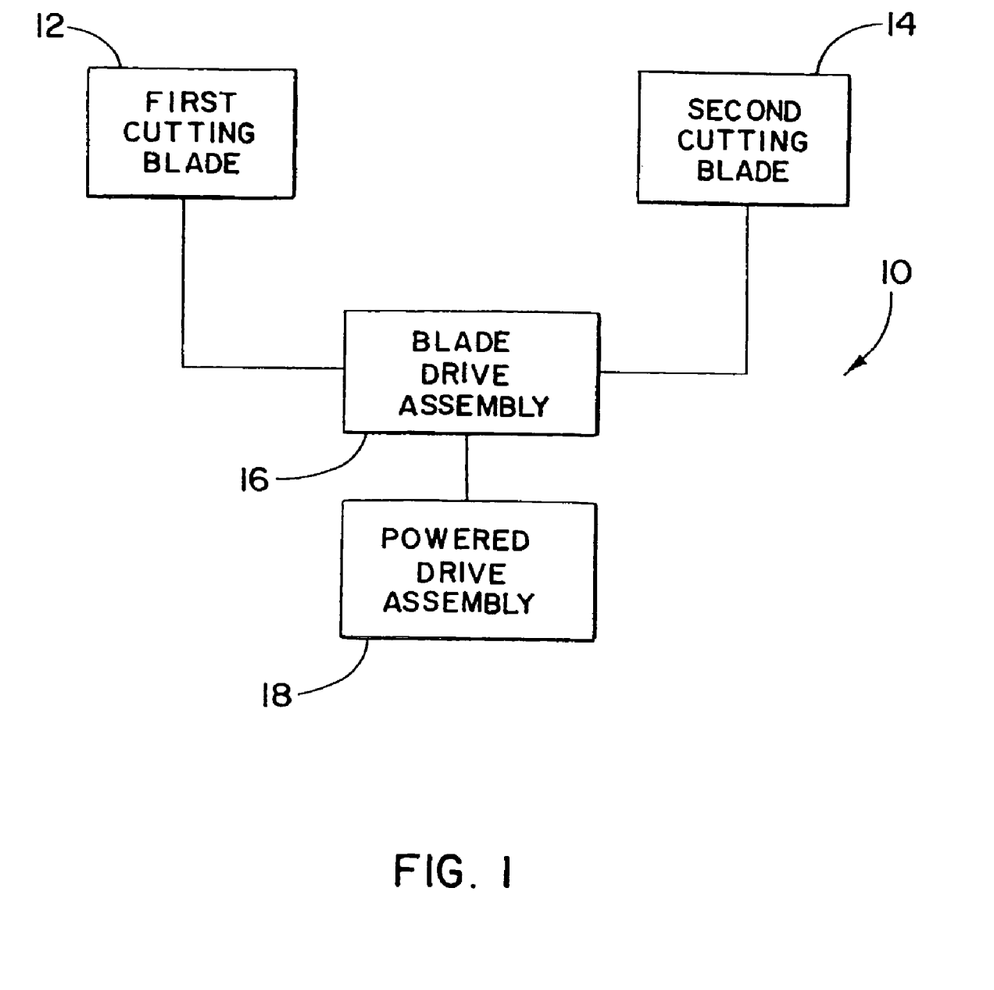
FIG. 1 is a schematic representation of a trimmer, according to the present invention, and including first and second cutting blades that are operated by a blade drive assembly through a powered drive assembly.

In FIG. 1, a schematic representation of a trimmer, into which the present invention is incorporated, as shown at 10. The trimmer 10 consists of a first cutting blade 12 and a second cutting blade 14 that are movable relative to each other and cooperate to produce a cutting action, as on vegetation, and the like. A blade drive assembly 16, operated through a powered drive assembly 18, causes the first and second cutting blades 12, 14 to be relatively moved in operation to effect cutting.

The trimmer 10 is shown in generic form to encompass virtually an unlimited number of different designs. What is preferred is that the first and second cutting blades 12, 14 are relatively movable, preferably reciprocatingly in predetermined cutting paths, to produce a cutting action. The cutting paths may be straight, angular, or otherwise.

A specific form of the trimmer 10 is shown in FIGS. 2-7. As noted above, this particular embodiment is intended to be illustrative only, as many variations thereof are contemplated, particularly with respect to the configuration of the cutting blades 12, 14 and the manner in which the cutting blades 12, 14 are mounted for movement relative to each other. Additionally, it is contemplated that the power drive assembly 18 may be gas or electric powered, with the latter as by a self-contained battery unit, using household current, or otherwise.

Figure 2:
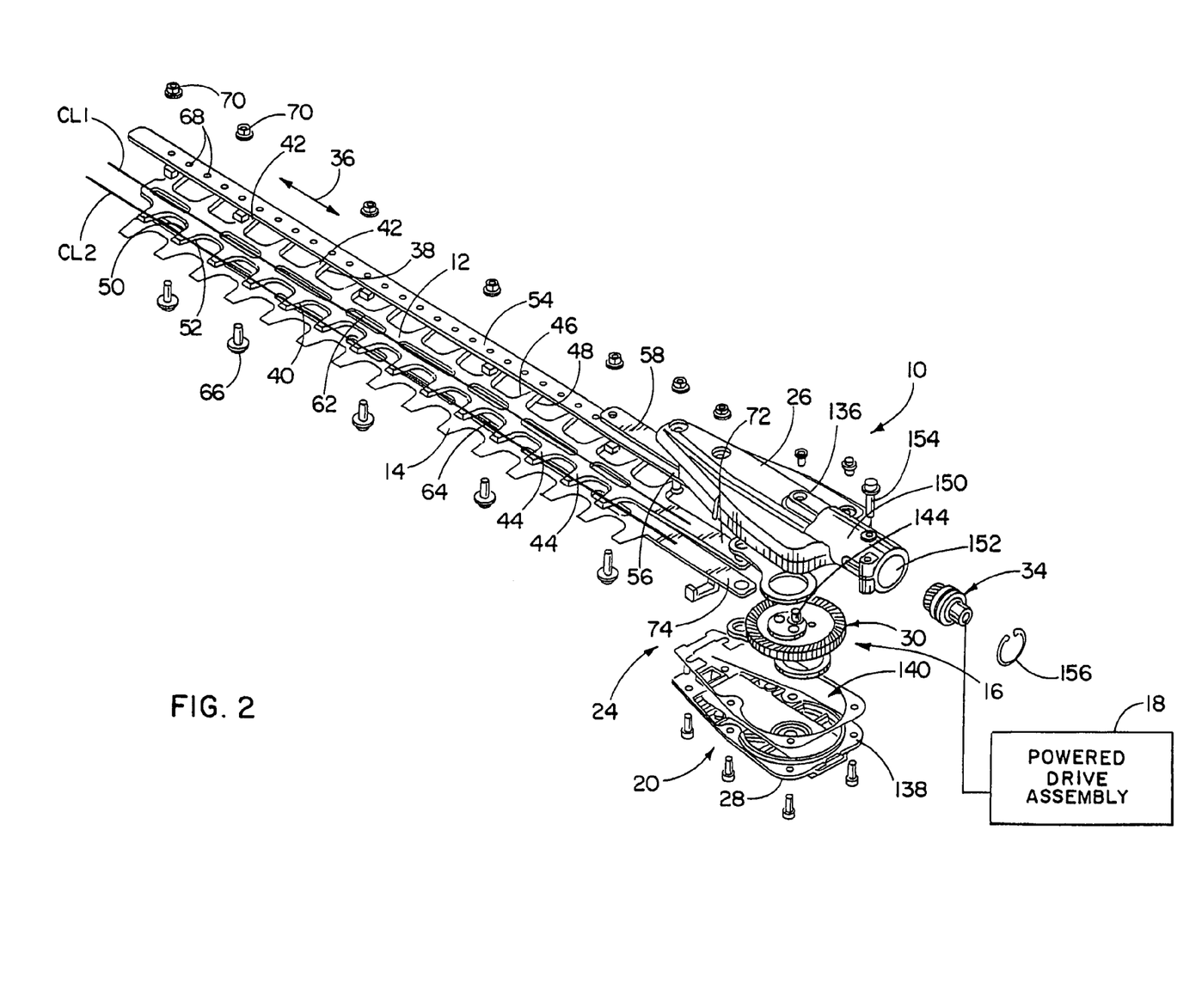
FIG. 2 is an exploded, partially schematic representation, of one form of the trimmer in FIG. 1 with the blade drive assembly including first and second drive gear assemblies.

The trimmer 10 has a frame/housing 20 to which the powered drive assembly 18 is mounted. The frame/housing 20 may have one or more handles 22 that can be grasped to facilitate lifting and controlled repositioning of the entire trimmer 10, preferably by a single individual. The inventive concept could be used, however, on units that are not "portable" in the sense that they can be easily carried and repositioned by a single individual.

The frame/housing 20 includes a frame/housing portion 24 consisting of joinable first and second housing parts 26, 28, respectively, which cooperatively contain the blade drive assembly 16. The blade drive assembly 16 consists of a first drive gear assembly 30 that rotates as one piece around a first axis 32. The blade drive assembly 16 further includes a second drive gear assembly 34 that cooperates with the first drive gear assembly 30 and transmits operating forces from the powered drive assembly 18 to the first drive gear assembly 30. The first drive gear assembly 30 cooperates with the first and second cutting blades 12,14 so that as the first drive gear assembly 30 rotates around the first axis 32 continuously in a first rotational direction, the first and second cutting blades 12, 14 are caused to reciprocatingly move, one relative to the other, respectively in first and second linear paths, as indicated by the double headed arrow 36.

The first and second cutting blades 12,14 each has a length parallel to the double-headed arrow 36 and a width dimension W transversely thereto that is substantially the same for each of the cutting blades 12, 14. The width W of the cutting blade 12 is bisected by a first center line CL1, with the width W of the second cutting blade 14 bisected by a second center line CL2.

The cutting blades 12,14 have substantially the same configuration. The exemplary first cutting blade 12 has cutting edges 38, 40 on opposite sides of the line CL1. The cutting blade 12 is preferably made from flat stock that is cut in a scalloped pattern on opposite sides of the line CL1 to produce truncated, triangular teeth 42 at regular intervals along the length of the cutting blade 12 to define the cutting edge 38. Like teeth 44 are formed on the opposite side of the centerline CL1 to define the cutting edge 40. The teeth 42, 44 are in lengthwise staggered relationship with respect to each other. The teeth 42 have opposite edges 46, 48 that are bevel cut to produce discrete cutting edge portions. The teeth 44 have corresponding edges 50, 52 producing like discrete cutting edge portions.

The cutting blades 12, 14 are operatively mounted upon the frame/housing part 24 through an elongate blade support 54 having a proximal end 56 that is fixed to the frame/housing portion 24. A cutter guide 58 overlies the blade support 54 and is secured to the frame/housing part 24 so as to define, in conjunction therewith, a guide channel 60 within which the blades 12, 14 are guided relative to each other and the frame/housing part 24 for translation movement along the line indicated by the arrow 36.

As noted above, the precise configuration of the cutting blades 12, 14, and their mounting structure, is not critical to the present invention. Thus, a detailed description thereof will be omitted herein. Additional detail of one suitable form of the cutting blades 12, 14, and their mounting structure, is shown in co-pending U.S. application Ser. No. 11/339,209, entitled "Trimmer and Method of Cutting a Material While Maintaining Cooperating Cutting Blades in a Desired Relationship", the disclosure of which is incorporated by reference. Other variations of this structure are shown in U.S. Pat. Nos. 5,271,154; 5,373,641; and 6,263,579, the disclosures of which are also incorporated herein by reference.

It suffices to say that the cutting blade 12 has a series of elongate mounting slots 62 that are registerable with elongate mounting slots 64 in the cutting blade 14 to accept threaded mounting bolts 66. The mounting bolts 66 each extend through a registered pair of mounting slots 62, 64 and into and through one of a series of mounting bores 68, at regularly spaced intervals along the length of the blade support 54. The mounting bolts 66 are secured by nuts 70. The mounting bolts 66 serve to maintain the widthwise alignment of the cutting blades 12, 14 and guide relative lengthwise movement between the cutting blades 12, 14 as they are relatively moved/driven, as hereinafter explained.

The cutting blade 12 has a proximal end 72 that is driven through the blade drive assembly 16, with the second cutting blade 14 having a like proximal end 74, driven similarly by the blade drive assembly 16. The first cutting blade 12 has a cylindrical stub post 76 that is used to drive the cutting blade 12, with the cutting blade 14 having a like cylindrical stub post 78.

The first drive gear assembly 30 has a first bevel gear 80 with substantially flat, axially oppositely facing surfaces 82, 84 on axially opposite sides thereof. Bevel gear teeth 86 are formed on the flat surface 82 in an annular array on one side, at the circular periphery 88 of the bevel gear 80.

The second drive gear assembly 34 consists of a second bevel gear 90 with teeth 92 in mesh with the teeth 86 on the first bevel gear 80. The second bevel gear 90 is journaled for a rotation within a bearing assembly 94 for rotation around a second axis 96, that is orthogonal to the first axis 32 of the first bevel gear 80. The powered drive assembly 18 is keyed within a connecting portion 98 on the second bevel gear 90 and is operable to rotate the second bevel gear 90 around the axis 96, thereby causing the second bevel gear 90 to rotate the first bevel gear 80 around its axis 32.

In the embodiment shown, the axis 96 of the second bevel gear 90 is not only parallel to the center lines CL1, CL2 of the cutting blades 12, 14, but also coincides with a reference plane P1 that bisects the cutting blades 12, 14 in a widthwise direction, i.e. extends through the center lines CL1, CL2.

In operation, the cutting blades 12, 14 have abutting flat surfaces 100,102, respectively, that slide guidingly, one against the other, parallel to, a reference plane P2. The second axis 96 is parallel to this reference plane P2. Of course, this specific relationship of parts is not required to practice the present invention.

The first bevel gear 80 has a first cam element 104 projecting from the flat surface 82 on one side of the first bevel gear 80 in one axial direction. The first cam element 104 has a circular disc shape with a center 106 that is radially offset from the first, central axis 32 of the first bevel gear 80. A corresponding, second cam element 108 projects from the flat surface 84 axially oppositely to the direction of projection of the first cam element 104 on the other side of the first bevel gear 80. The second cam element 108 has a center 110 that is radially offset from both the first, center axis 32 of the first bevel gear 80 and the center axis 106 of the first cam element 104.

The first and second cutting blades 12, 14 are connected to the first bevel gear 80 through like connecting rods 112, 114 placed one each on the opposite sides of the first bevel gear 80. The connecting rod 112 spans across the teeth 86 and is made from flat stock material and has an enlarged larger end 116 and a smaller end 118. The larger end 116 has a circular opening 120 that receives the first cam element 104. The smaller end 118 has an opening 122 that receives the cylindrical stud post 76 on the first cutting blade 12. The first cam element 104 and opening 120 are dimensioned so that the first cam element 104 can guidingly rotate freely therewithin. The cylindrical stud post 76 is guidingly rotatable within the opening 122 in like fashion.

Figure 3:
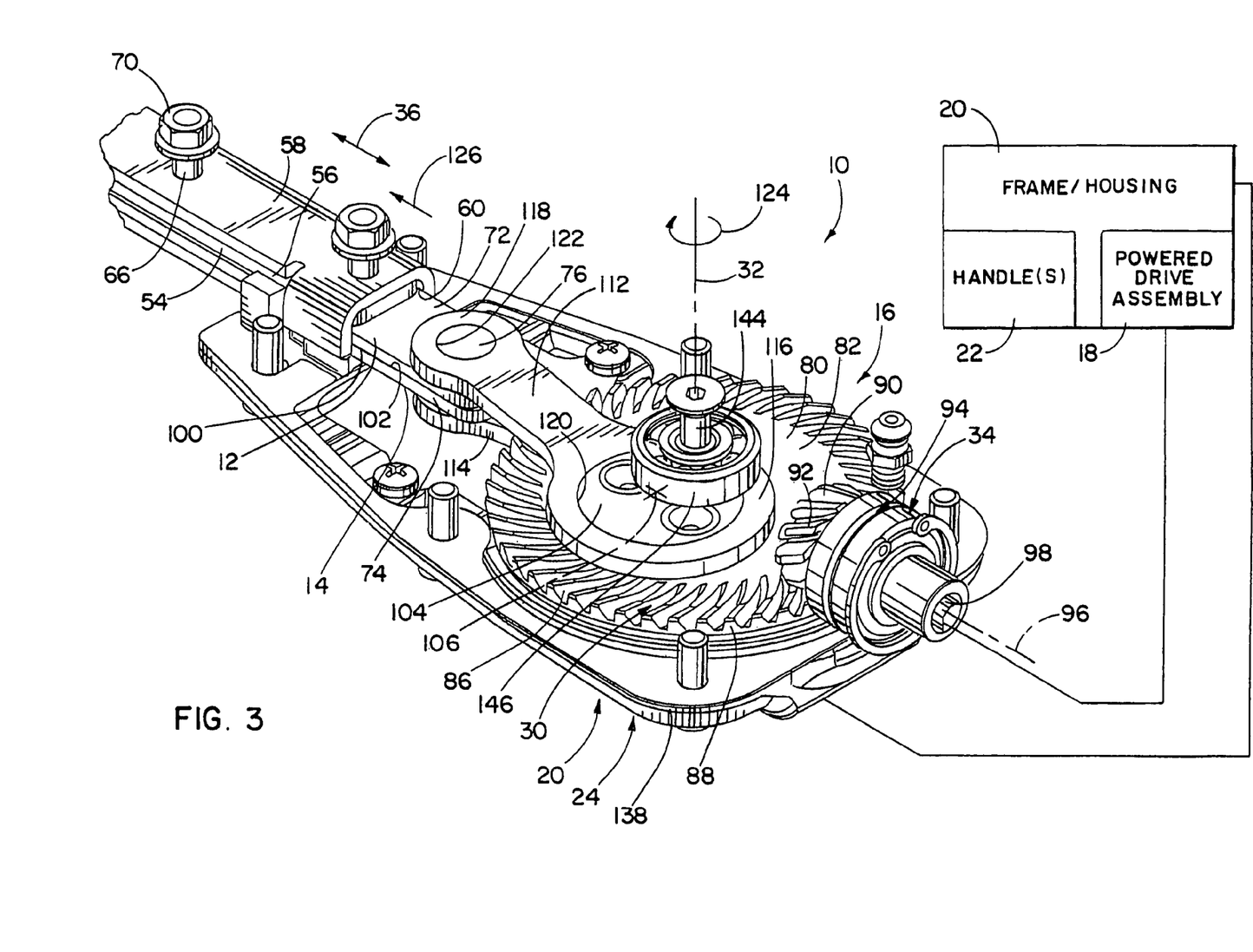
FIG. 3 is an enlarged, fragmentary, partially schematic representation of the first and second drive gear assemblies, shown in FIG. 2, and operatively connected to one of two joinable housing parts.
Figure 4:
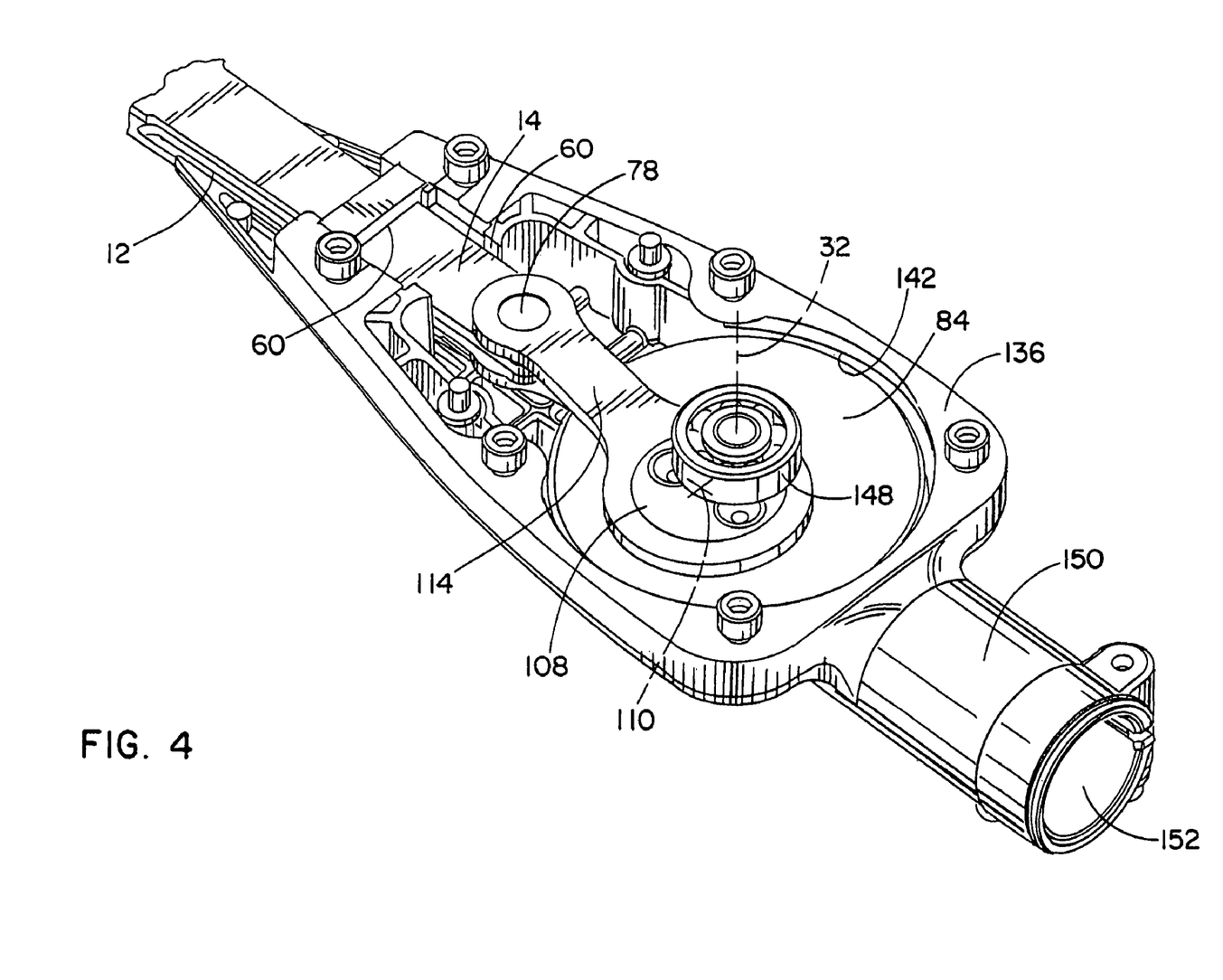
FIG. 4 is a view as in FIG. 3, but inverted, and showing the first and second drive gear assemblies operatively mounted to the other of the joinable housing parts.

As the first bevel gear 80 is rotated about the axis 32, through a single turn in the direction indicated by the arrow 124 in FIG. 3, a drive force is transferred from the first cam element 104 through the connecting rod 112 so as to initially thereby cause the first cutting blade 12 to move in the direction of the arrow 126. At the end of the lengthwise path for the first cutting blade 12 moving in the direction of the arrow 126, the force on the connecting rod 112 generated by the first cam element 104 reverses, to thereby move the first cutting blade 12 to the opposite end of its lengthwise stroke. For each rotation of the first bevel gear 80, the first cutting blade 12 reciprocates through a complete lengthwise stroke in opposite directions.

The second cutting blade 14 is driven in like fashion, through the cooperation of the second cam element 108, cylindrical stud post 78, and connecting rod 114. However, the cam elements 104,108 are relatively situated so that as the first bevel gear 80 is rotated around the axis 32, the cutting blades 12, 14 are always moving reciprocatingly in opposite lengthwise directions to produce the desired cutting action.

Figures 5, 6, 7:
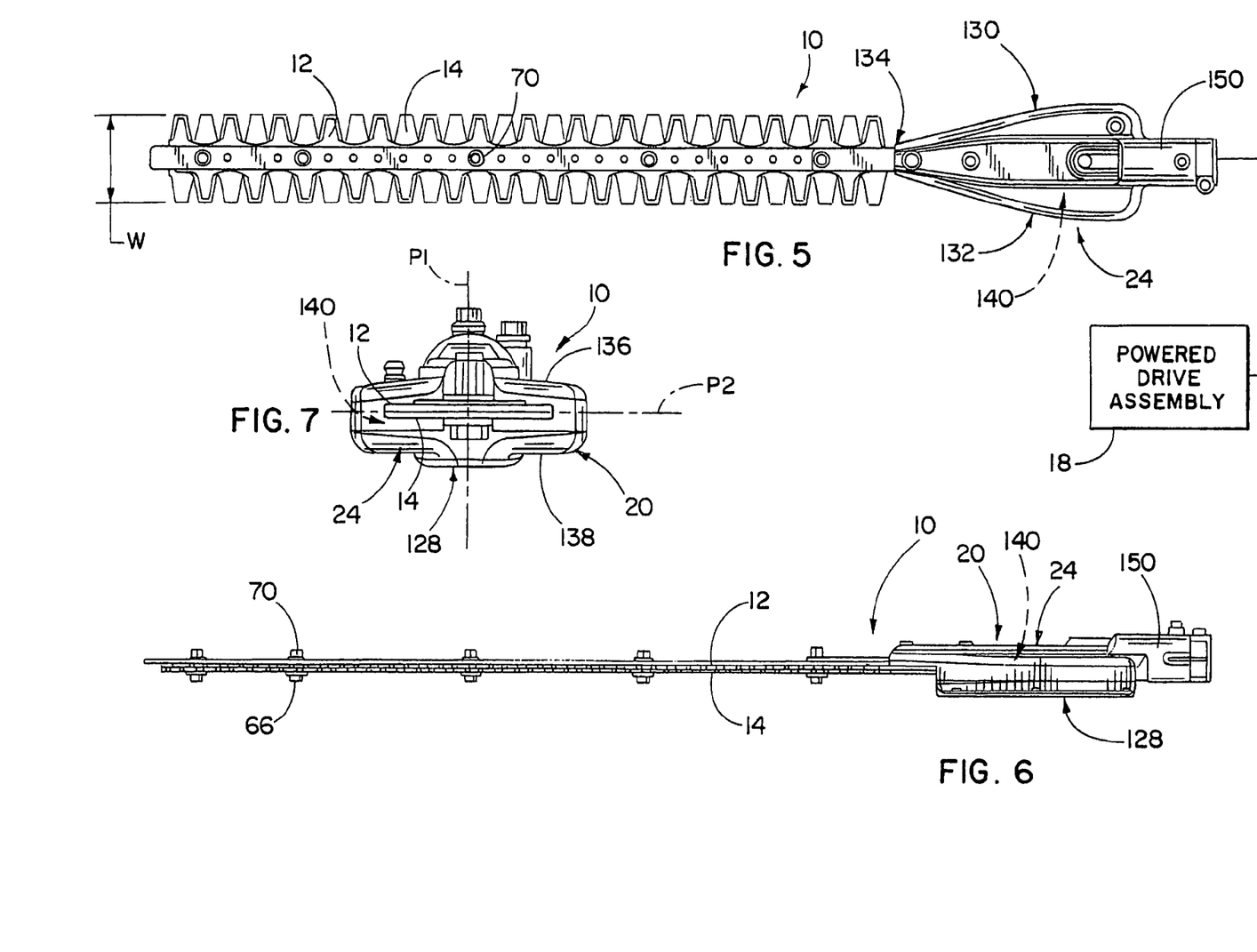
FIG. 5 is an assembled, plan view of the cutting blades and blade drive assembly in FIG. 2.
FIG. 6 is a side elevation view of the assembled components shown in FIG. 5.
FIG. 7 is an enlarged, end elevation view of the assembled components shown in FIGS. 5 and 6.

With this arrangement, the dimension of the frame/housing part 24 can be made relatively compact along the axis 32, as seen clearly in FIGS. 6 and 7, with the axis 96 located so that it is not spaced any substantial distance from the cutting bade 12. As seen particularly in FIG. 6, the bottom 128 of the frame/housing portion 24 is not required to project appreciably above or below the cutting blades 12, 14, thereby affording a relatively streamlined outer surface that is not prone to hanging up on vegetation in use. Additionally, the opposite sides 130, 132 of the frame/housing portion 24 taper progressively approaching the blades 12, 14 to an end 134 at which the proximal ends 72, 74 of the cutting blades 12, 14 reside. The end 134 has a widthwise dimension that is only slightly greater than that of the cutting blade ends 72, 74 and significantly less than their width W. Accordingly, the frame/housing portion 24 can be directed guidingly lengthwise into and along vegetation without being prone to hanging up thereon.

To facilitate assembly, and contribute to the compact overall configuration of the frame/housing portion 24, the frame/housing portion 24 is made with joinable housing parts 136, 138. The housing parts 136, 138 cooperatively define a receptacle 140 for the first drive gear assembly 30. In this embodiment, the housing part 136 has a discrete sub-receptacle 142 conforming relatively closely to the overall circular shape of the first bevel gear 80, which can be nested therewithin. The widest dimension of the frame/housing portion 24 may be made only slightly greater than the diameter of the first bevel gear 80.

The first bevel gear 80 has an associated shaft 144 that is fixed to the first bevel gear 80. The shaft 144 is guided in rotation by bearings 146, 148 on axial opposite sides of the first bevel gear 80. In this embodiment, the shaft 144, and the central axis 32 thereof, extends through each of the cam elements 104, 108.

The housing part 136 has a split collar 150 with a receptacle 152 for the second drive gear assembly 34. The receptacle 152 is restricted by tightening a threaded fastener 154 to thereby hold the second drive gear assembly 34 in place. A C-ring 156 within the receptacle 152 limits lengthwise movement of the second drive gear assembly 34 therewithin.

The first drive gear assembly 30 is designed so that the first bevel gear 80 and first and second cam elements 104, 108 rotate as one piece around the axis 32. The cam elements 104, 108 can be separate elements that are joined to the bevel gear 80. Alternatively, the entire drive gear assembly can be machined as a single piece.

The foregoing disclosure of specific embodiments is intended to be illustrative of the broad concepts comprehended by the invention.

The invention claimed is:

1. A trimmer comprising:
a first cutting blade having a first cutting edge;
a second cutting blade having a second cutting edge;
a first drive gear assembly that rotates as one piece around a first axis,
the first drive gear assembly cooperating with the first and second cutting blades so that as the first drive gear assembly rotates around the first axis continuously in a first rotational direction, the first and second cutting blades are caused to reciprocatingly move, one relative to the other, respectively in first and second paths, so that the first and second cutting edges cooperate to produce a cutting action,
a second drive gear assembly comprising a second drive gear that has teeth that are in mesh with teeth on the first drive gear assembly,
the second drive gear rotatable around a second axis, transverse to the first axis, continuously in one rotational direction to thereby cause the first drive gear assembly to be continuously rotated in the first rotational direction; and
a powered drive assembly for rotating the second drive gear around the second axis in the one rotational direction,
wherein the teeth on the first drive gear assembly are defined by a first bevel gear and the second gear is a bevel gear that is in mesh with the first bevel gear so that rotation of the second bevel gear around the second axis causes direct driving rotation of the first drive gear assembly around the first axis,
wherein the first bevel gear has substantially flat surfaces on first and second axially opposite sides, the surfaces facing axially oppositely with respect to the first axis,
wherein the teeth on the first bevel gear are on the first side of the first bevel gear,
wherein a first cam element projects axially relative to the first axis from one of the axially oppositely facing surfaces on the first bevel gear and drives the first cutting blade in the first cutting path as the first bevel gear rotates,
wherein a second cam element projects axially relative to the first axis from the other of the axially opposite facing surfaces of the first bevel gear and drives the second cutting blade in the second cutting path as the first bevel gear rotates,
wherein there is a first connecting rod at the first side of the first bevel gear that spans across the teeth on the first bevel gear and transfers drive forces between the first cam element and the first cutting blade,
wherein there is a second connecting rod at the second side of the first bevel gear that transfers drive forces between the second cam element and the second cutting blade.

2. The trimmer according to claim 1 wherein the first and second blades are elongate with a length extending along first and second substantially parallel lines, and the first and second paths are substantially parallel to the first and second lines.

3. The trimmer according to claim 2 wherein the second axis is substantially parallel to the first and second lines.

4. The trimmer according to claim 3 wherein the first and second cutting blades have a width bisected by a reference plane and the second axis coincides with the reference plane.

5. The trimmer according to claim 1 wherein the first and second blades reciprocate in their respective paths substantially parallel to a reference plane and the second axis is substantially parallel to the reference plane.

6. The trimmer according to claim 1 wherein the trimmer further comprises a frame/housing with a frame/housing portion having first and second housing parts that are joined to captively maintain the first drive gear assembly in an operative position.

7. The trimmer according to claim 6 wherein one of the housing parts has a discrete receptacle conforming to, and for receiving, the first bevel gear.

8. The trimmer according to claim 1 wherein the trimmer further comprises a frame/housing, the frame/housing comprising a frame/housing portion defining a receptacle for the first drive gear assembly and the frame/housing portion has a width that tapers in a direction approaching the first and second cutting blades.

9. The trimmer according to claim 8 wherein the first and second cutting blades have a combined width, the first bevel gear has a diameter and the width of the frame/housing portion tapers from a dimension slightly greater than the diameter of the first bevel gear to an end having a width less than the combined width of the cutting elements so that the end of the frame/housing portion can be directed guidingly into and along vegetation in use.

10. The trimmer according to claim 1 wherein the first cam element has a substantially round shape with a central axis that is parallel to, and spaced from, the first axis and the second cam element has a substantially round shape with a central axis that is parallel to, and spaced from, the first axis.

11. The trimmer according to claim 10 wherein the first axis extends through the first and second cam elements.

12. A trimmer comprising:
a first cutting blade having a first cutting edge;
a second cutting blade having a second cutting edge;
a first drive gear assembly that rotates as one piece around a first axis,
the first drive gear assembly cooperating with the first and second cutting blades so that as the first drive gear assembly rotates around the first axis continuously in a first rotational direction, the first and second cutting blades are caused to reciprocatingly move, one relative to the other, respectively in first and second paths, so that the first and second cutting edges cooperate to produce a cutting action,
a second drive gear assembly comprising a second drive gear that has teeth that are in mesh with teeth on the first drive gear assembly,
the second drive gear rotatable around a second axis continuously in one rotational direction to thereby directly continuously rotate the first drive gear assembly in the first rotational direction around the first axis; and
a powered drive assembly for rotating the second drive gear around the second axis in the one rotational direction,
wherein the first and second blades are elongate with a length extending along first and second substantially parallel lines, and the first and second paths are substantially parallel to the first and second lines,
wherein the second axis is substantially parallel to the first and second lines and is not spaced any substantial distance from one of the first and second cutting blades.

13. The trimmer according to claim 12 wherein the first and second blades reciprocate in their respective paths substantially parallel to a reference plane and the second axis is substantially parallel to the reference plane.

14. The trimmer according to claim 12 wherein the first drive gear assembly has substantially flat surfaces that face axially oppositely with respect to the first axis, a first cam element projects axially relative to the first axis from one of the axially oppositely facing surfaces on the first drive gear assembly and drives the first cutting blade in the first cutting path as the first drive gear assembly rotates, and a second cam element projects axially relative to the first axis from the other of the axially opposite facing surfaces of the first drive gear assembly and drives the second cutting blade in the second cutting path as the first drive gear assembly rotates.

15. The trimmer according to claim 14 wherein the first cam element has a substantially round shape with a central axis that is parallel to, and spaced from, the first axis and the second cam element has a substantially round shape with a central axis that is parallel to, and spaced from, the first axis.

16. The trimmer according to claim 15 wherein the first axis extends through the first and second cam elements.

17. The trimmer according to claim 12 wherein the trimmer further comprises a frame/housing with a frame/housing portion having first and second housing parts that are joined to captively maintain the first drive gear assembly in an operative position.

18. The trimmer according to claim 12 wherein the first and second cutting blades have a width bisected by a reference plane and the second axis coincides with the reference plane.

* * * * *